(12) United States Patent
Miyoshi

(10) Patent No.: US 11,112,531 B2
(45) Date of Patent: Sep. 7, 2021

(54) METHOD OF CREATING LONGITUDINAL SECTION OF THREE-DIMENSIONAL POINT GROUP DATA, AND SURVEY DATA PROCESSING DEVICE AND SURVEY SYSTEM FOR THE SAME

(71) Applicant: TOPCON CORPORATION, Tokyo (JP)

(72) Inventor: Ryosuke Miyoshi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 438 days.

(21) Appl. No.: 16/033,396

(22) Filed: Jul. 12, 2018

(65) Prior Publication Data

US 2019/0033487 A1      Jan. 31, 2019

(30) Foreign Application Priority Data

Jul. 31, 2017   (JP) .............................. JP2017-148503

(51) Int. Cl.
*G01C 11/00*   (2006.01)
*G01S 17/89*   (2020.01)
*G01V 99/00*   (2009.01)
*G06T 17/05*   (2011.01)
*G06T 17/10*   (2006.01)
(Continued)

(52) U.S. Cl.
CPC ............ *G01V 99/005* (2013.01); *G01C 11/00* (2013.01); *G01S 7/4808* (2013.01); *G01S 17/89* (2013.01); *G06T 17/05* (2013.01); *G06T 17/10* (2013.01); *G01C 11/06* (2013.01); *G06T 2210/56* (2013.01)

(58) Field of Classification Search
CPC ...... G01V 99/005; G01C 11/00; G01C 11/06; G01S 17/89; G01S 7/4808; G06T 17/05; G06T 17/10; G06T 2210/56
USPC ........... 702/5, 94, 150–153, 181, 188; 703/2
See application file for complete search history.

(56) References Cited

U.S. PATENT DOCUMENTS

2007/0104353 A1\* 5/2007 Vogel .................... G01C 15/00
                                                                        382/106
2007/0257910 A1\* 11/2007 Gutmann ........... G06K 9/00201
                                                                        345/424
(Continued)

FOREIGN PATENT DOCUMENTS

JP          2006003280 A       1/2006
JP          2006003280 A   \*  12/2010

*Primary Examiner* — Jeffrey P Aiello
(74) *Attorney, Agent, or Firm* — Roberts Calderon Safran & Cole P.C.

(57) ABSTRACT

Provided is a method of creating a longitudinal section along an arbitrary line from three-dimensional point group data of terrain or a structure, and a survey data processing device and a survey system for the same. The method includes (a): setting an arbitrary longitudinal section creation line by sequentially designating a plurality of interval designation points on an X-Y plane of three-dimensional point group data (X, Y, Z), (b): projecting a Z point surveyed between a start point and an end point of a certain interval among a plurality of intervals defined by the interval designation points, onto a vertical virtual plane including the longitudinal section creation line, corresponding to (X, Y) coordinates of the longitudinal section creation line, and (c): performing the step (b) for all of the intervals.

6 Claims, 6 Drawing Sheets

(51) Int. Cl.
  *G01S 7/48* (2006.01)
  *G01C 11/06* (2006.01)

(56) References Cited

U.S. PATENT DOCUMENTS

| | | | |
|---|---|---|---|
| 2009/0138233 A1* | 5/2009 | Kludas | G06K 9/32 |
| | | | 702/158 |
| 2011/0235897 A1* | 9/2011 | Watanabe | G06T 7/75 |
| | | | 382/154 |
| 2013/0033495 A1* | 2/2013 | Kiyota | E02F 9/261 |
| | | | 345/420 |
| 2014/0204204 A1* | 7/2014 | Sumiyoshi | G08G 1/168 |
| | | | 348/140 |
| 2016/0203604 A1* | 7/2016 | Gupta | A61C 7/002 |
| | | | 382/128 |
| 2019/0025411 A1* | 1/2019 | Kuroda | G01S 17/89 |

\* cited by examiner

METHOD OF CREATING LONGITUDINAL SECTION OF THREE-DIMENSIONAL POINT GROUP DATA, AND SURVEY DATA PROCESSING DEVICE AND SURVEY SYSTEM FOR THE SAME

TECHNICAL FIELD

The present invention relates to a method of creating a longitudinal section of terrain or a structure, and a survey data processing device and a survey system for the same.

BACKGROUND ART

In recent years, with development of digital technologies, it becomes possible to acquire three-dimensional point group data of terrain or a structure by using a laser scanner or a photogrammetric camera (for example, Patent Literature 1).

CITATION LIST

Patent Literature

Patent Literature 1: Japanese Published Unexamined Patent Application No. 2006-3280

SUMMARY OF THE INVENTION

Technical Problem

On the other hand, a longitudinal section of a survey site is required in some cases. Generally, a method of creating a longitudinal section from a terrain map is known. In detail, a horizontal line is drawn on a terrain map, altitude lines showing altitudes are drawn parallel to the horizontal line, and from points at which the horizontal line and contour lines of the terrain map intersect with each other, perpendiculars are drawn to the altitude lines showing altitudes, and intersection points between the altitude lines and the perpendiculars are plotted. By connecting all plotted points, a longitudinal section of terrain on the horizontal line is created.

However, by the general method described above, for a road including curves such as a mountain road, a longitudinal section along a curve of the road cannot be created.

An object of the present invention is to provide a method of creating a longitudinal section along an arbitrary line from three-dimensional point group data of terrain or a structure, and a survey data processing device and a survey system for the same.

Solution to Problem

In order to solve the above-described problem, a method of creating a longitudinal section according to an aspect of the present invention includes (a): a step of setting an arbitrary longitudinal section creation line by sequentially designating a plurality of interval designation points on an X-Y plane of three-dimensional point group data (X, Y, Z), (b): a step of projecting a Z point surveyed between a start point and an end point of a certain interval among a plurality of intervals defined by the interval designation points, onto a vertical virtual plane including the longitudinal section creation line, corresponding to (X, Y) coordinates of the longitudinal section creation line, and (c): a step of performing the step (b) for all of the intervals.

In the aspect described above, it is also preferable that the method includes (d): a step of developing and displaying a plurality of the virtual planes on the same plane after the step (c).

A survey data processing device according to an aspect of the present invention creates a longitudinal section in which, onto a vertical virtual plane including an arbitrary longitudinal section creation line defined from a plurality of interval designation points sequentially designated on an X-Y plane of three-dimensional point group data (X, Y, Z), a Z point surveyed between a start point and an end point of an interval is projected corresponding to (X, Y) coordinates of the longitudinal section creation line.

In the aspect described above, it is also preferable to display a longitudinal section in which a plurality of the virtual planes are developed on the same plane.

A survey system according to an aspect of the present invention includes surveying equipment including at least any one of a point group measuring device, a ground traveling body, and a flying body that survey three-dimensional point group data (X, Y, Z) of terrain or a structure, and a survey data processing device that creates a longitudinal section in which, onto a vertical virtual plane including an arbitrary longitudinal section creation line defined from a plurality of interval designation points sequentially designated on an X-Y plane of three-dimensional point group data (X, Y, Z) surveyed with the surveying equipment, a Z point surveyed between a start point and an end point of a certain interval is projected corresponding to (X, Y) coordinates of the longitudinal section creation line.

Effect of the Invention

According to the present invention, a longitudinal section on an arbitrary line can be created from three-dimensional point group data of terrain or a structure.

DESCRIPTION OF EMBODIMENTS

Next, preferred embodiments of the present invention are described with reference to the drawings.

Survey Data Processing Device

Figure 1:
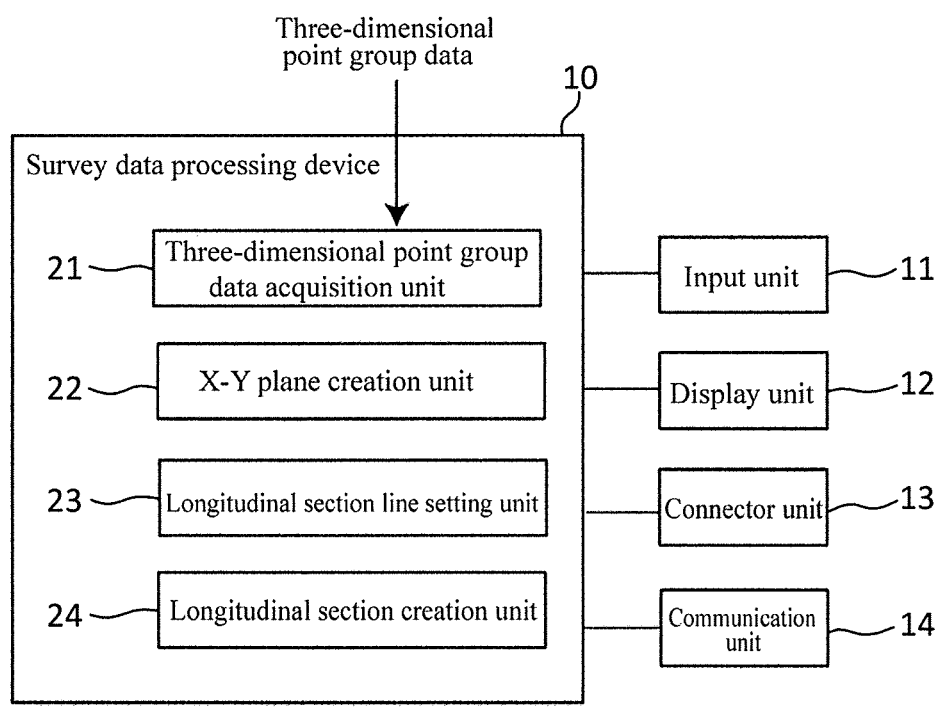
FIG. 1 is a block diagram of a survey data processing device according to an embodiment.

FIG. 1 shows a survey data processing device 10 (hereinafter, referred to as processing device 10) according to an embodiment. The processing device 10 is configured by software in a general-purpose computer, dedicated hardware using a PLD (Programmable Logic Device), etc., a tablet terminal, a smartphone, or the like. The processing device 10 includes a CPU and other dedicated operation devices, and storage media such as a semiconductor memory and a hard disk, etc. The processing device 10 includes, as necessary, an input unit 11 such as a keyboard or a touch-panel display, a display unit 12 such as a liquid crystal display, a connector unit 13 that can exchange information with a portable storage medium such as a USB memory, and a communication unit 14 that makes wireless communication and wired communication.

As shown in FIG. 1, the processing device 10 includes a three-dimensional point group data acquisition unit 21, an X-Y plane creation unit 22, a longitudinal section creation line setting unit 23, and a longitudinal section creation unit 24.

The three-dimensional point group data acquisition unit 21 acquires three-dimensional point group data of a measuring target, and stores them in the storage medium. The three-dimensional point data are measured by surveying equipment described below. The three-dimensional point group data include three-dimensional coordinate data at each measurement point of the measuring target. As a system of coordinates to indicate three-dimensional coordinates, an orthogonal coordinate system (X, Y, Z) is adopted. The three-dimensional point group data acquisition unit 21 acquires three-dimensional point group data via the connector unit 13 or the communication unit 14.

The X-Y plane creation unit 22 projects three-dimensional point group data acquired by the three-dimensional point group data acquisition unit 21 onto an X-Y plane so that the data can be browsed on the display unit 12.

Figure 2A:
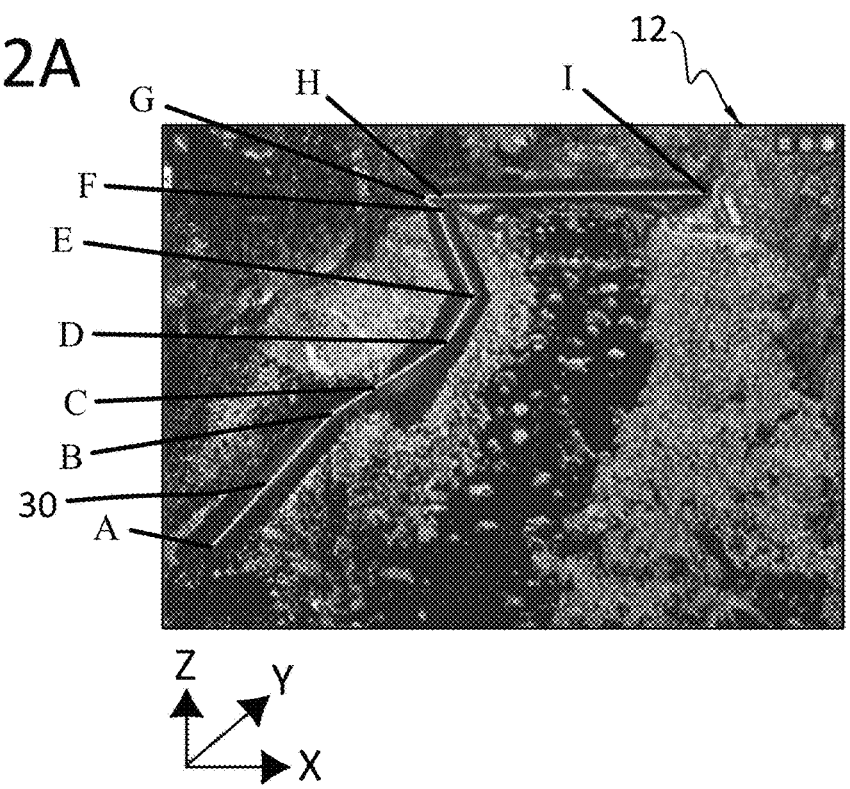
FIG. 2A is a view showing an example of setting a longitudinal section creation line.
Figure 2B:
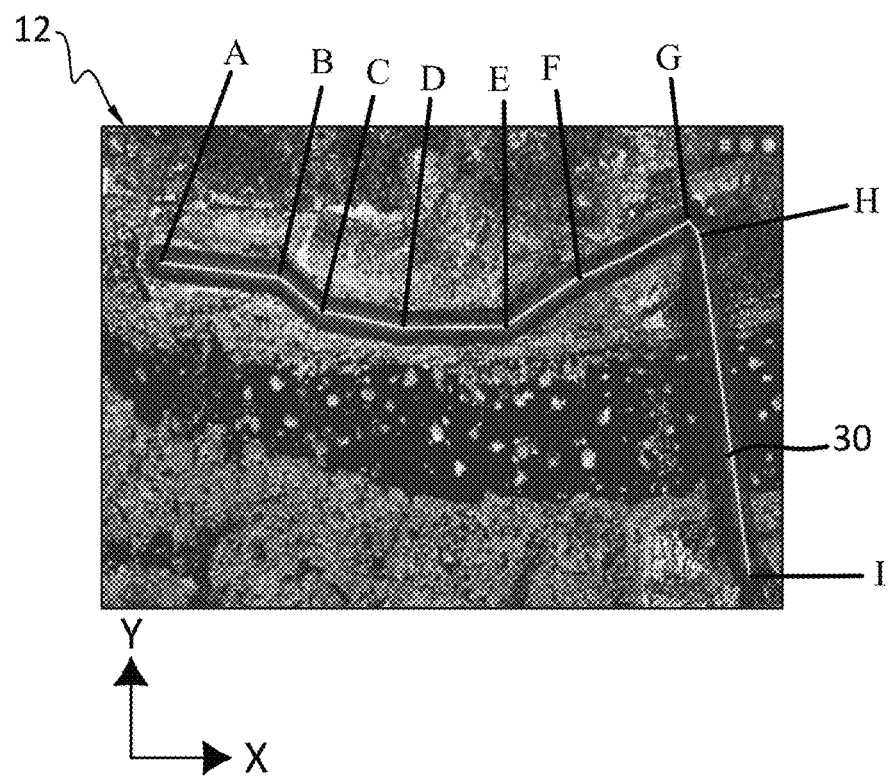
FIG. 2B is a view showing an example of setting a longitudinal section creation line.

The longitudinal section creation line setting unit 23 executes an application program to make a user set a longitudinal section creation line, and makes the display unit 12 display a screen according to the application. FIG. 2A and FIG. 2B show examples of this application screen, and are views showing examples of setting a longitudinal section creation line. In detail, first, the longitudinal section creation line setting unit 23 displays an X-Y plane created by the X-Y plane creation unit 22 on the display unit 12. FIG. 2A and FIG. 2B show 3D models obtained by synthesizing three-dimensional point group data measured with a three-dimensional laser scanner with an image of a survey site taken with a camera. The 3D model may be displayed perspectively to the X-Y plane as shown in FIG. 2A, or may be displayed so that the X-Y plane is planarly viewed as shown in FIG. 2B. A point of view with respect to the X-Y plane can be arbitrarily changed by a user.

The longitudinal section creation line setting unit 23 instructs the user to designate an interval in which a longitudinal section is to be created on the X-Y plane. The user designates a start point and an end point of an interval in which a longitudinal section is to be created according to the application. The interval designation points are sequentially designated, and an end point of a previous interval is set as a start point of a next interval. In detail, as an example of FIG. 2A or FIG. 2B, the user designates interval designation points A, B, C, D, . . . , and I along a road shape by using, for example, a mouse or the like. When the interval designation points are designated, the longitudinal section creation line setting unit 23 recognizes the interval A-B, the interval B-C, the interval C-D, . . . , the interval H-I, and sets the line segment A-B, the line segment B-C, the line segment C-D, . . . , and the line segment H-I as longitudinal section creation lines 30.

The longitudinal section creation unit 24 plots, in the respective intervals defined by the interval designation points, Z points surveyed between the start points and the end points of the intervals on vertical virtual planes including the longitudinal section creation lines 30 (virtual planes in the Z direction), corresponding to the (X, Y) coordinates of the longitudinal section creation lines 30.

Figure 3:
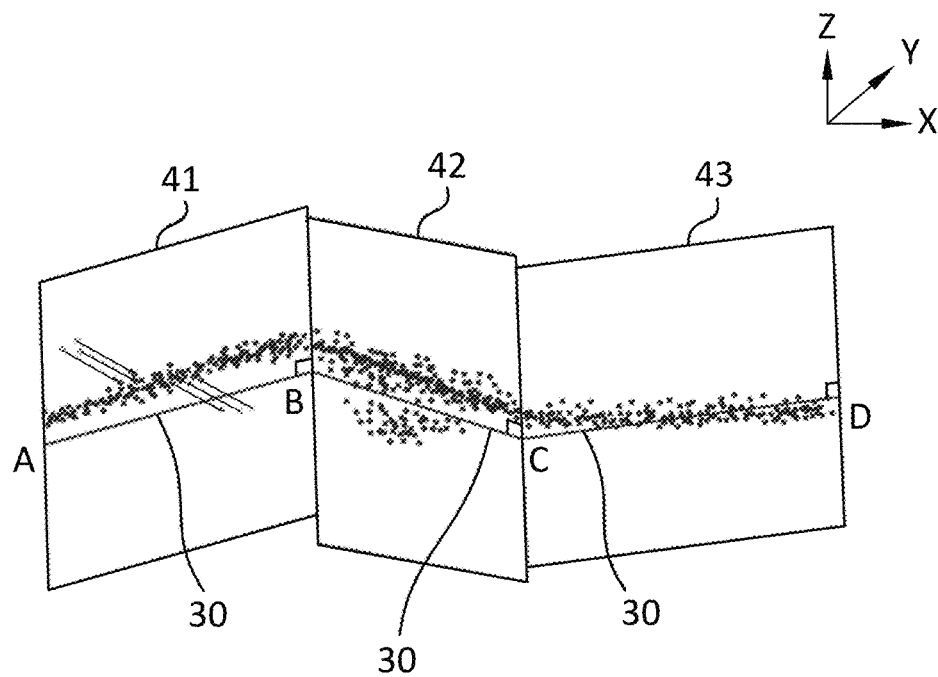
FIG. 3 is a view showing an example of creating a longitudinal section.

FIG. 3 is a view showing an example of creating a longitudinal section. The longitudinal section creation unit 24 projects, in the interval A-B, all of the Z points acquired in the interval A-B onto a vertical first virtual plane 41 including the line segment A-B (longitudinal section creation line 30). Similarly, in the interval B-C, onto a vertical second virtual plane 42 including the line segment B-C (longitudinal section creation line 30), all of the Z points acquired in the interval B-C are projected. Similarly, in the interval C-D, onto a vertical third virtual plane 43 including the line segment C-D (longitudinal section creation line 30), all of the Z points acquired in the interval C-D are projected. This operation is performed for all intervals up to the interval H-I. Accordingly, a plurality of longitudinal sections along the longitudinal section creation lines 30 including curves are created.

Figure 4:
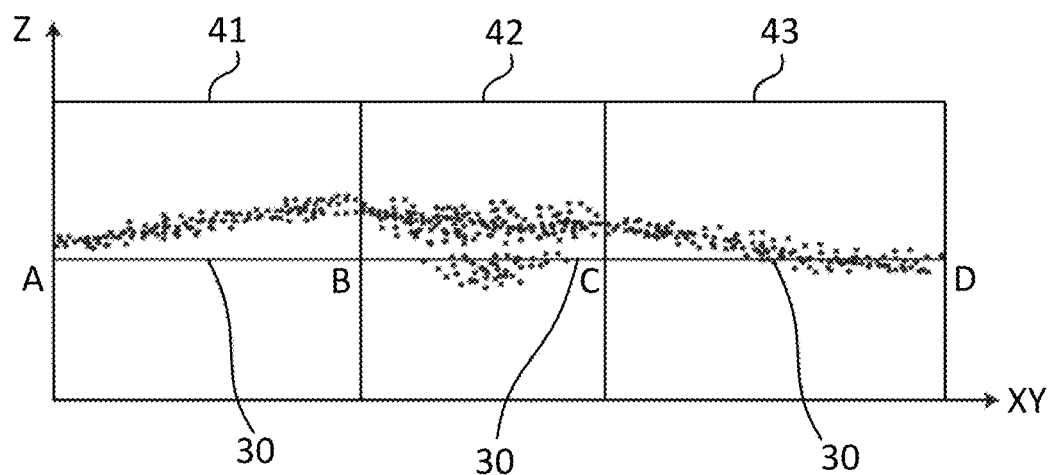
FIG. 4 is a view showing an example of displaying a longitudinal section.

The longitudinal section creation unit 24 two-dimensionally develops the plurality of longitudinal sections by matching end points of previous intervals with start points of next intervals. FIG. 4 is a view showing an example indicating a longitudinal section. In FIG. 4, the interval A-B, the interval B-C, and the interval C-D corresponding to FIG. 3 are shown. An end point (point B) of the interval A-B is matched with a start point of the interval B-C. An end point (point C) of the interval B-C is matched with a start point of the interval C-D. That is, the first virtual plane 41 and the second virtual plane 42 are developed on the same plane by using the point B as a reference point, and the second virtual plane 42 and the third virtual plane 43 are developed on the same plane by using the point C as a reference point. Accordingly, a sequential two-dimensional longitudinal section along the longitudinal section creation lines 30 is created. This longitudinal section is displayed on the display unit 12 so that the vertical axis shows an altitude Z and the horizontal axis includes the X-Y plane. The longitudinal section creation unit 24 may display a longitudinal section of all intervals, or may extract and display a longitudinal section of an arbitrary interval designated by a user.

Method of Creating Longitudinal Section

Figure 5:
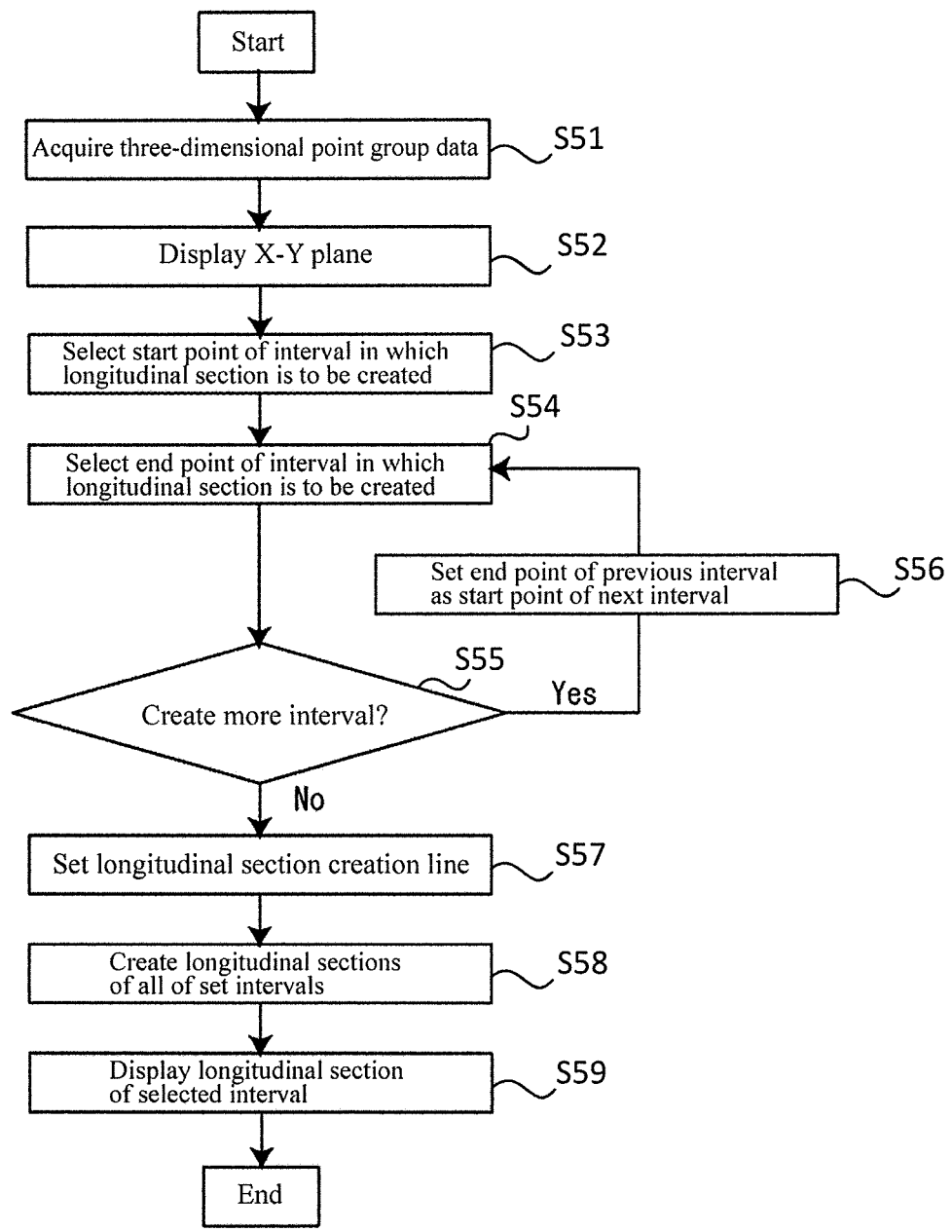
FIG. 5 is a process flowchart of the survey data processing device according to the embodiment.

FIG. 5 is a process flowchart of the processing device 10. First, in Step S51, three-dimensional point group data (X, Y, Z) of a measuring target are acquired by the three-dimensional point group data acquisition unit 21. Next, in Step S52, by the X-Y plane creation unit 22, browsing of an X-Y plane of the three-dimensional point group data acquired in Step S51 is enabled. Next, in Step S53, the longitudinal section creation line setting unit 23 selects, on the displayed X-Y plane, a start point of an interval in which a longitudinal section is to be created, and in Step S54, selects an end point of the interval in which a longitudinal section is to be created. Next, in Step S55, whether the interval is to be created further is called in to question by the longitudinal section creation line setting unit 23. When a further interval is to be created (Yes), the process shifts to Step S56, the end point of the previous interval is set as a start point of a next interval, and the process returns to Step S54. In Step S55, when no further interval is to be created (No), the process shifts to Step S57, and a longitudinal section creation line 30 is set. Next, the process shifts to Step S58, and by the longitudinal section creation unit 24, a longitudinal section of each set interval is created. Last, the process shifts to Step S59, and by the longitudinal section creation unit 24, a two-dimensional longitudinal section of an interval selected among the set intervals is displayed on the display unit 12.

Figure 6:
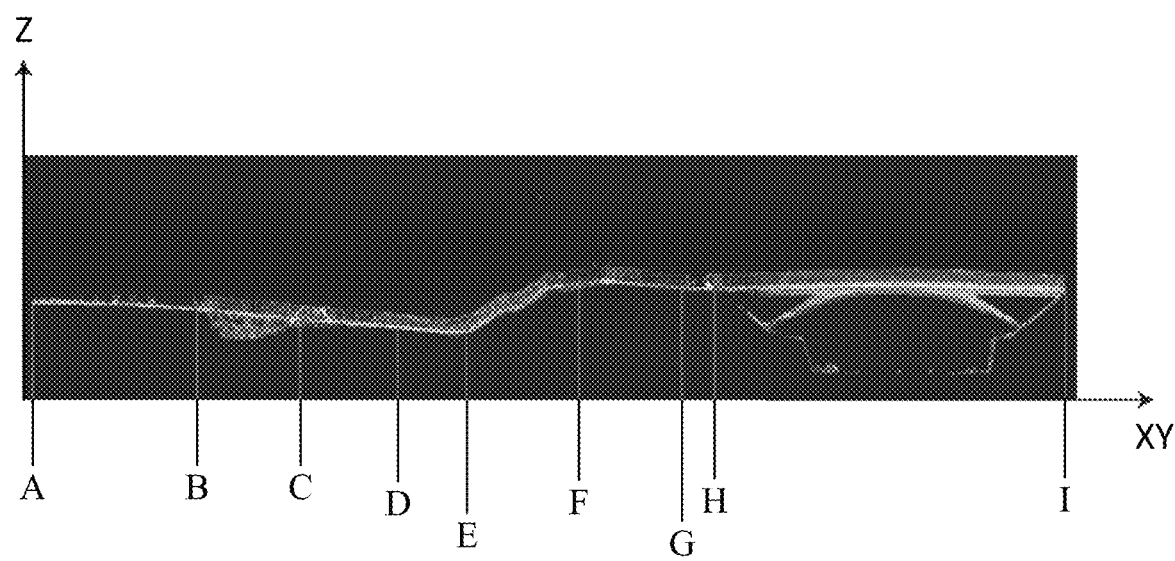
FIG. 6 shows an example of a longitudinal section created by the survey data processing device according to the embodiment.

FIG. 6 shows an example of a longitudinal section created by the processing device 10. FIG. 6 is a longitudinal section on the longitudinal section creation lines 30 set in FIG. 2, and shows the interval designation points A to I by setting a vertical axis showing an altitude Z and a horizontal axis as an axis including an XY plane.

As described above, by the processing device 10 according to the embodiment, a longitudinal section on an arbitrary line on a measuring target can be created by arbitrarily sequentially designating line segments along which longitudinal sections are to be created. In particular, by the processing device 10, a longitudinal section along a shape of a road that includes curves can be created. In addition, by the processing device 10, by finely designating intervals in which longitudinal sections are to be created (by designating short distances between interval designation points), a longitudinal section of a road having a large curvature can also be created.

Preferably, by sequentially developing longitudinal sections along longitudinal section creation lines 30 on the same plane, a two-dimensional longitudinal section can be displayed.

Survey System

Figure 7:
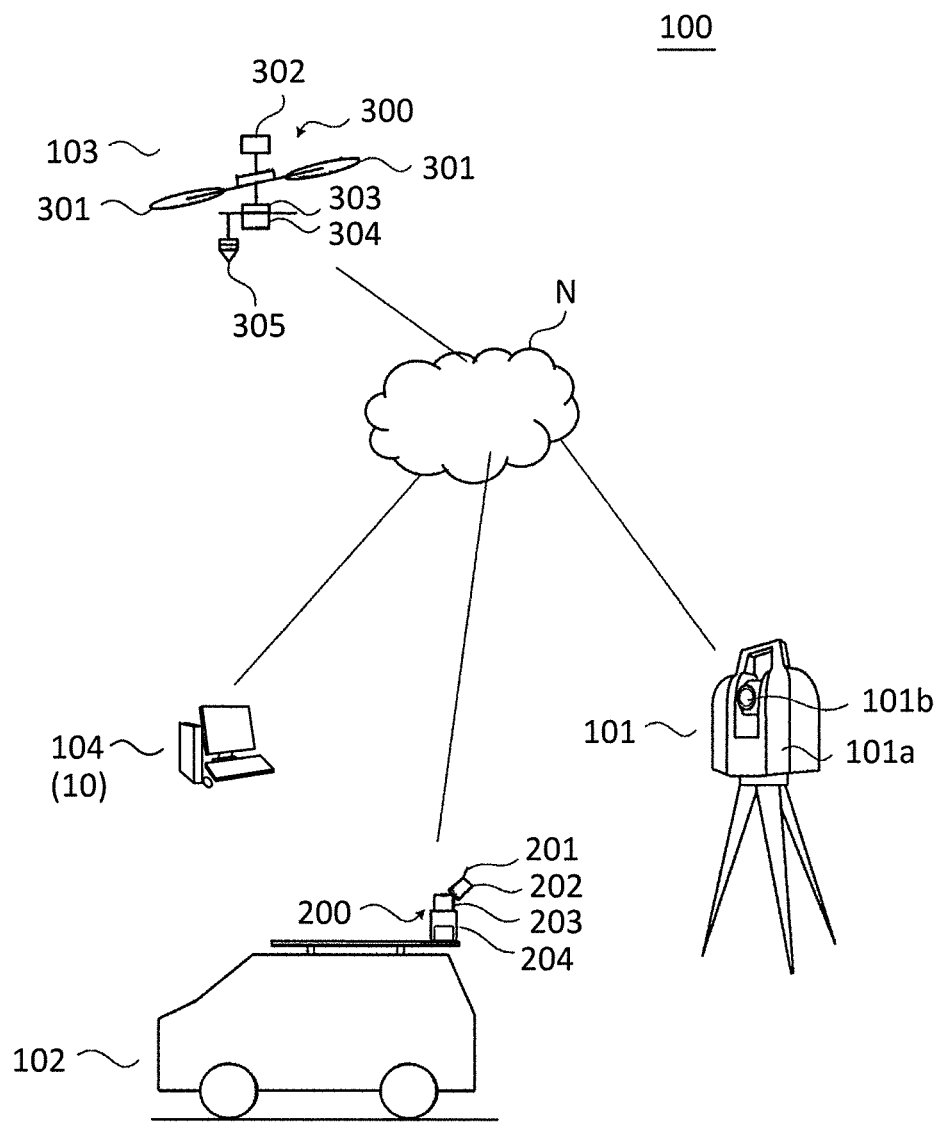
FIG. 7 is a configuration diagram of a survey system according to an embodiment.

Next, a survey system preferable for the present invention, using the processing device 10 as one of the components, is described with reference to the drawings. FIG. 7 shows a survey system 100 according to an embodiment. The reference sign 104 denotes a general-purpose personal computer that embodies the processing device 10. The survey system 100 includes the personal computer 104 and at least any one of the surveying equipment shown with the reference signs 101 to 103. The reference sign 101 denotes a point group measuring device installed at a survey site. The reference sign 102 denotes a ground traveling body equipped with a point group measuring unit 200. The reference sign 103 denotes a flying body equipped with a point group measuring unit 300.

The processing device 10, the point group measuring device 101, the ground traveling body 102, and the flying body 103 are capable of communicating with each other via a communication network N such as the Internet. The communication network N may include arbitrary communication networks such as local area networks, connection cables, and satellite communication networks, etc.

The point group measuring device 101 is a three-dimensional laser scanner, and is installed at a known point in a survey site. The point group measuring device 101 includes a main body 101a that rotates horizontally around a vertical axis, and a rotary irradiation unit 101b provided rotatable vertically on the main body 101a. The main body 101a is provided with at least a horizontal rotary drive unit, a horizontal angle detector, an arithmetic control unit, a storage unit, a display unit, an operation unit, a light emitting unit, and a light receiving unit. The rotary irradiation unit 101b is provided with at least a turning mirror, a vertical rotary drive unit, and a vertical angle detector. The turning mirror rotates vertically at a constant high angular velocity, and rotates horizontally integrally with the main body 101a.

A rotation angle of the turning mirror is detected by the vertical angle detector and the horizontal angle detector. A pulse laser emitted from the light emitting unit is scanned in the vertical direction and the horizontal direction by the turning mirror. The pulse laser reflected from the measurement point is received by the light receiving unit consisting of a photodiode, etc. The arithmetic control unit is a microcontroller including, for example, a CPU, a ROM, and a RAM, etc., mounted in an integrated circuit, and obtains a distance to the measurement point by measuring a time of reciprocation of a distance-measuring light from an output signal of the light receiving unit. From values of the horizontal angle detector and the vertical angle detector, an angle of the measurement point is measured. Then, from distances, horizontal angles, and vertical angles of respective measurement points, three-dimensional point group data are obtained.

The ground traveling body 102 is just required to be a moving body that can travel in a survey site, and is preferably, for example, a vehicle or a carriage. The ground traveling body 102 is equipped with the point group measuring unit 200. The point group measuring unit 200 includes, in order from the upper side, a GNSS (Global Navigation Satellite System) antenna 201, a scanner 202, a camera 203, and an IMU (Inertial Measurement Unit) 204. The GNSS antenna 201 acquires position information of the traveling body 102. The camera 203 is a digital camera including an image sensor such as a CCD or a CMOS sensor as an imaging device, and acquires images of the whole circumference (360 degrees) around the camera. The scanner 202 is a rotary-type laser scanner that rotationally scans a plurality of laser beams, and acquires three-dimensional point group data of 360 degrees in the circumferential direction. The IMU 204 includes a triaxial gyro and a triaxial accelerometer, and acquires three-dimensional angular velocity and acceleration. By using the ground traveling body 102 equipped with the point group measuring unit 200, a 3D model in which three-dimensional point group data measured with the scanner 202 is synthesized with an image taken by the camera 203 can be created.

The flying body 103 is a UAV (Unmanned Air Vehicle) that can autonomously fly. The flying body 103 includes a point group measuring unit 300, and a plurality of propellers 301 extending radially from a shaft of the flying body 103. The point group measuring unit 300 includes, in order from the upper side, a GNSS antenna 302, an IMU 303, a camera 304, and a prism 305. The GNSS antenna 302 acquires position information of the flying body 103. The IMU 303 acquires three-dimensional angular velocity and acceleration. The camera 304 is a digital camera including an image sensor such as a CCD or CMOS sensor as an imaging device. In an image taken by the camera 304, positions of respective pixels are identified by, for example, orthogonal coordinates based on an origin set at a point that a camera optical axis passes through. The prism 305 can be tracked and a distance thereto can be measured by a total station (electronic distance and angle measuring instrument). By using the flying body 103 equipped with the point group measuring unit 300, three-dimensional point group data can be obtained by stereo-matching a plurality of sequential images taken by the camera 304.

By using the survey system 100, from surveying equipment (at least any one of the point group measuring device 101, the ground traveling body 102 equipped with the point group measuring unit 200, and the flying body 103 equipped with the point group measuring unit 300), three-dimensional point group data of a survey site can be acquired. From the three-dimensional point group data acquired by the surveying equipment, the processing device 10 can create a longitudinal section on an arbitrary line.

The point group measuring device 101, the ground traveling body 102, and the flying body 103 are preferred examples of the surveying equipment that surveys three-dimensional point group data. The surveying equipment in the survey system 100 is not limited to these three forms, and any surveying equipment is included in the surveying equipment mentioned in this description capable of measuring three-dimensional point group data of terrain or a structure. The processing device 10 is just required to acquire three-dimensional point group data from the surveying equipment via the communication unit 14 or the connector unit 13.

Although preferred embodiments and modifications of the present invention are described above, each embodiment and each modification can be combined based on knowledge of a person skilled in the art, and such a combined embodiment is also included in the scope of the present invention.

REFERENCE SIGNS LIST

10 Survey data processing device
21 Three-dimensional point group data acquisition unit
22 X-Y plane creation unit
23 Longitudinal section creation line setting unit
24 Longitudinal section creation unit
30 Longitudinal section creation line
41, 42, 43 Virtual plane
100 Survey system
101 Point group measuring device
102 Traveling body
200 Point group measuring unit
103 Flying body
300 Point group measuring unit

The invention claimed is:

1. A method of creating a longitudinal section from three dimensional point group data obtained from a survey by use of a survey data processing device that includes a CPU, a memory, an input unit, and a display, comprising:
   (a): acquiring three-dimensional point group data (X, Y, Z) from surveying equipment that includes at least any one of a point group measuring device, a ground traveling body, and a flying body, and storing the three-dimensional point group data in the memory;
   (b): projecting the three-dimensional point group data onto an X-Y plane and displaying the X-Y plane on the display;
   (c): inputting into the input unit a longitudinal section creation line formed by sequentially designating a plurality of interval designation points limited to the X-Y plane shown on the display, wherein an end point of a previous interval is set as a start point of a next interval;
   (d): using the CPU to project Z points of the three-dimensional point group onto a vertical virtual plane between a start point and an end point of a selected interval among the plurality of intervals defined by the interval designation points that correspond to (X, Y) coordinates of the longitudinal section creation line;
   (e): performing step (d) for all of the intervals to obtain a plurality of vertical virtual planes corresponding to the plurality of intervals; and
   (f): using the CPU to combine the resulting plurality of virtual planes on a same plane by matching end points of previous intervals with start points of next intervals and displaying the one plane on the display.

2. The method of creating a longitudinal section of claim 1 wherein the plurality of interval designation points define a plurality of interconnected line segments that form the longitudinal section creation line, and wherein at least two of the line segments are non-colinear with respect to each other.

3. A survey data processing device for creating a longitudinal section from three dimensional point group data obtained from a survey, comprising:
   a memory;
   an input unit;
   a display, and
   a CPU including a three-dimensional point group data acquisition unit, an X-Y plane creation unit, a longitudinal section creation line setting unit, and a longitudinal section creation unit, wherein
      the three-dimensional point group data acquisition unit acquires three-dimensional point group data (X, Y, Z) from the memory that was generated by a surveying device including at least any one of a point group measuring device, a ground traveling body, and a flying body,
      the X-Y plane creation unit projects the three-dimensional point group data onto an X-Y plane and displays the X-Y plane on the display,
      the longitudinal section creation line setting unit sets a longitudinal section creation line from the input unit by sequentially designating a plurality of interval designation points limited to the X-Y plane, wherein an end point of a previous interval is set as a start point of a next interval such that the interval designation points define a plurality of intervals on the longitudinal section creation line, and
      the longitudinal section creation unit projects Z points between a start point and an end point for each interval onto a vertical virtual plane that includes the longitudinal section creation line; develops the resulting plurality of vertical virtual planes on a same one plane by matching end points of previous intervals with start points of next intervals, and displays the one plane on the display.

4. The survey data processing device for creating a longitudinal section of claim 3 wherein the plurality of interval designation points define a plurality of interconnected line segments that form the longitudinal section creation line, and wherein at least two of the line segments are non-colinear with respect to each other.

5. A survey system for creating a longitudinal section from three dimensional point group survey data, comprising:
   surveying equipment including at least any one of a point group measuring device, a ground traveling body, and a flying body that survey three-dimensional point group data (X, Y, Z) of terrain or a structure; and
   a survey data processing device that includes a memory, an input unit, a display, and a CPU that includes a three-dimensional point group data acquisition unit, an X-Y plane creation unit, a longitudinal section creation line setting unit, and a longitudinal section creation unit, wherein
      the three-dimensional point group data acquisition unit acquires three-dimensional point group data (X, Y, Z) generated by the surveying equipment,
      the X-Y plane creation unit projects the three-dimensional point group data onto an X-Y plane and displaying the X-Y plane on the display,
      the longitudinal section creation line setting unit sets a longitudinal section creation line from the input unit by sequentially designating a plurality of interval designation points limited to the X-Y plane, wherein an end point of a previous interval is set as a start point of a next interval such that the interval designation points defines a plurality of intervals on the longitudinal section creation line, and the longitudinal section creation unit projects Z points between a start point and an end point of each interval defined by the interval designation points onto a vertical virtual plane that includes the longitudinal section creation line and corresponds to (X, Y) coordinates of the longitudinal section creation line, and develops the resulting plurality of the virtual planes on a same one plane by matching end points of previous intervals with start points of next intervals, and displays the one same plane on the display.

6. The survey system for creating a longitudinal section of claim 5 wherein the plurality of interval designation points define a plurality of interconnected line segments that form the longitudinal section creation line, and wherein at least two of the line segments are non-colinear with respect to each other.

\* \* \* \* \*